Dec. 19, 1933.　　　H. M. GIFFIN　　　1,939,974
CLUTCH MECHANISM
Filed Oct. 22, 1931　　2 Sheets-Sheet 1
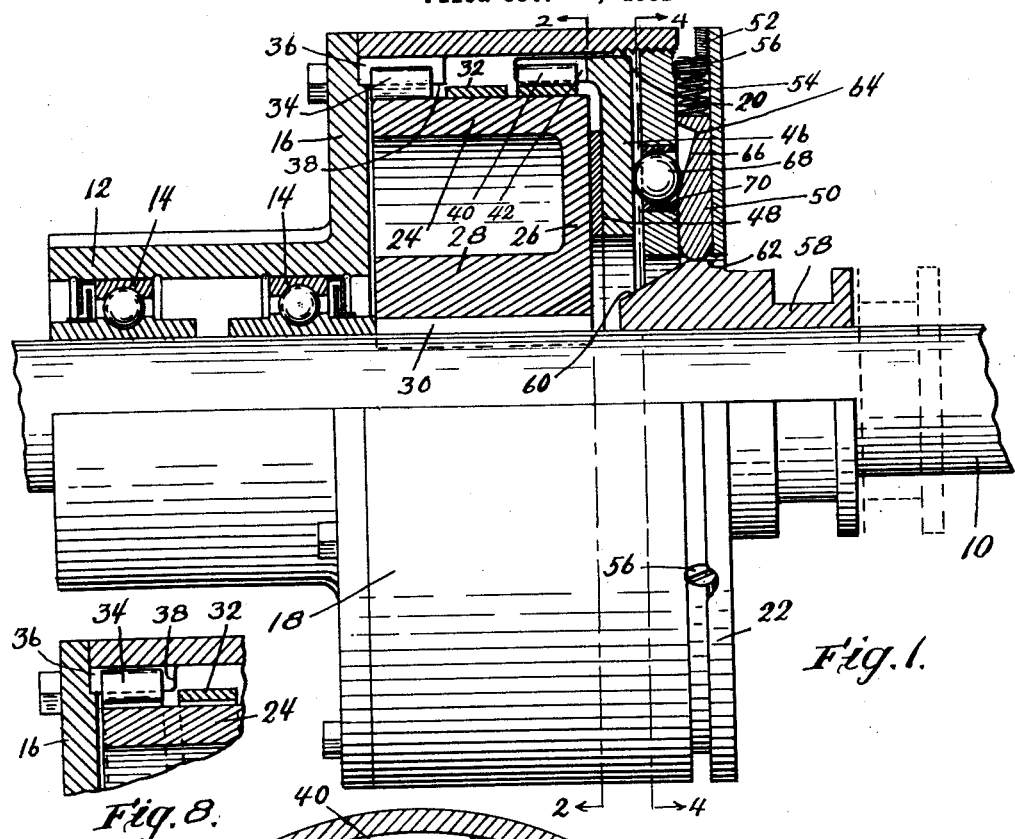
Fig. 1.
Fig. 8.
Fig. 7.
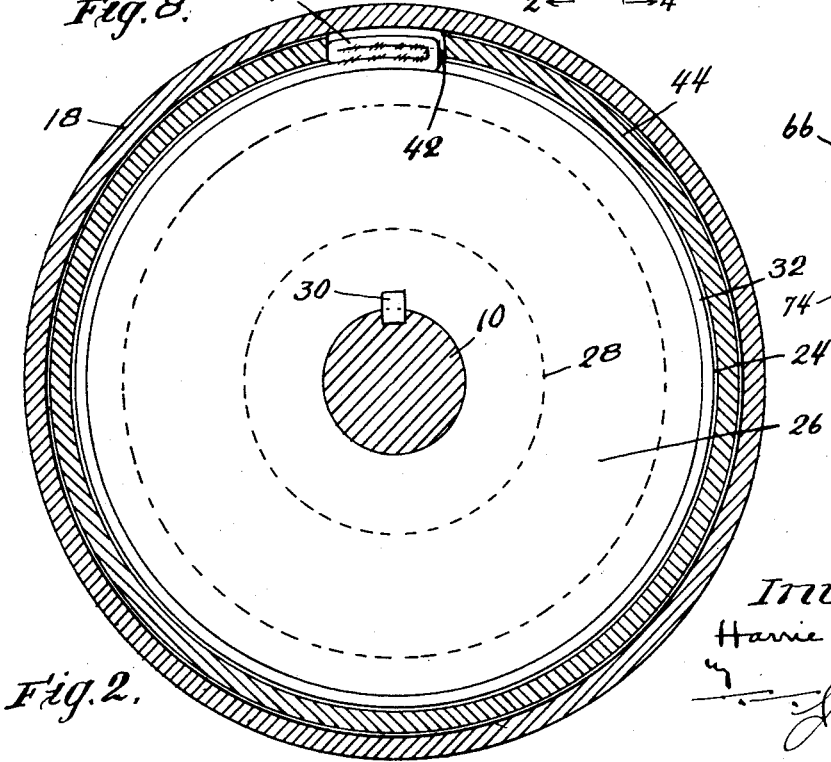
Fig. 2.
Inventor.
Harrie M. Giffin Dec. 19, 1933.   H. M. GIFFIN   1,939,974
CLUTCH MECHANISM
Filed Oct. 22, 1931   2 Sheets-Sheet 2
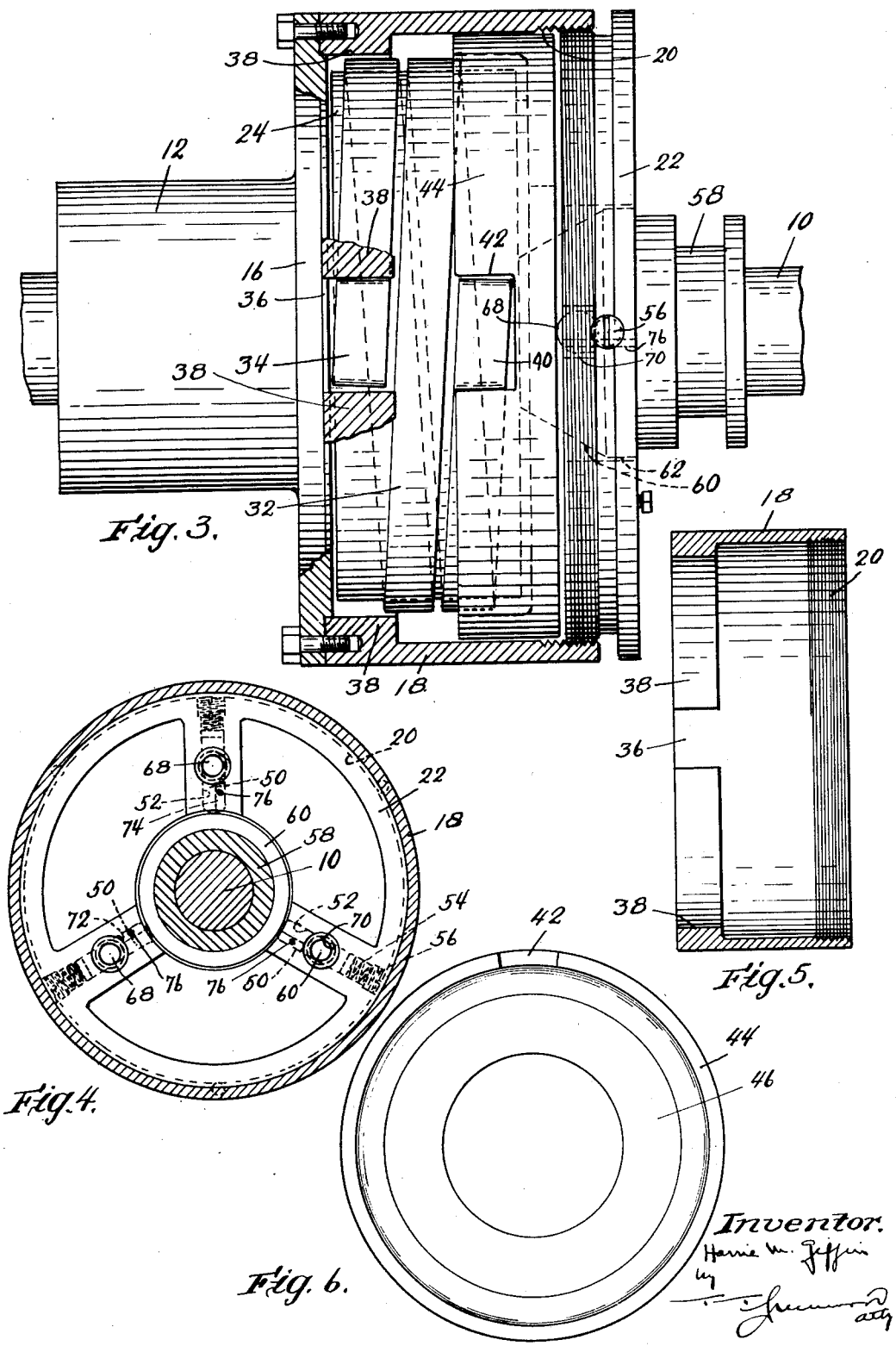

Patented Dec. 19, 1933

1,939,974

UNITED STATES PATENT OFFICE 1,939,974

CLUTCH MECHANISM

Harrie M. Giffin, Jamaica Plain, Mass.

Application October 22, 1931. Serial No. 570,275

9 Claims. (Cl. 192—35)

This invention relates to clutch mechanism adapted to connect a driving element with a driven element as, for instance, a driving shaft with a driven drum or pulley.

One of the objects of the present invention is an improved form of clutch mechanism necessitating but a small amount of effort of the actuating mechanism to set the clutch.

A further object of the invention is the provision of a clutch mechanism wherein the cooperating clutch elements are maintained in engagement mainly through the rotation of one of the rotating members.

Another object of the invention is the provision of an improved form of clutch mechanism having a main clutch and an auxiliary clutch, the auxiliary clutch serving to maintain the main clutch in engaged condition.

A yet further object of the invention is the provision of a clutch mechanism having cooperating parts that engage smoothly and yet forcibly and can transmit a large amount of power with relatively small dimensions of the mechanism.

Another object of the invention is the provision of a clutch mechanism having a clutch element consisting of a band which is carried by the driven element and is adapted to be wrapped about the driving element by the rotation thereof.

A yet further object is generally to improve the construction and operation of clutch mechanisms.

Fig. 1 is a side elevation, shown partly in longitudinal section, of a clutch mechanism embodying the present invention.

Fig. 2 is a section taken along line 2—2 of Fig. 1.

Fig. 3 is a plan view of the clutch mechanism of Fig. 1, part of the enclosing casing being broken away to illustrate the internal construction.

Fig. 4 is a section taken along line 4—4 of Fig. 1.

Fig. 5 is a sectional view of the cylindrical enclosing casing.

Fig. 6 is an end view of the auxiliary clutch plate.

Fig. 7 is a perspective view of a clutch actuating cam member.

Fig. 8 is a sectional detail showing the clutch band in expanded or clutch-free condition.

The clutch mechanism herein shown is adapted to connect the driving shaft 10 with the driven hub 12 that is rotatably mounted on the shaft by suitable bearings 14. The hub is provided at one end with a radially outstanding flange 16 that is secured to a cylindrical enclosing casing 18 over an open end thereof. The other open end of said enclosing casing has internal screw threads 20 which are engaged by the external screw threads of a cover plate 22 which also constitutes a supporting member for a portion of the clutch actuating mechanism. The driving shaft 10 is provided with a cylindrical drum 24 having a radial end wall 26 and a hub 28 that is fixed to the driving shaft by suitable means as the key 30. The clutch mechanism includes a main clutch member which comprises a flat spiral band 32 of resilient material which can be composed of a single turn, or a plurality of turns, the illustrated band having three turns which are arranged in spiral order about the periphery of the drum 24. The normal inner diameter of the convolutions of the band is adapted to be slightly in excess of that of the drum 24 so that when the clutch is disengaged the inherent resiliency of the band will cause it to expand and to assume a position where it is free from clutching engagement with the drum. One end of the band 32 is reflexed upon itself, with the reflexed parts fixed, or brazed, together to provide an upstanding projection or key 34 which is loosely received in a slot 36 of an inwardly directed flange 38 of the cylindrical enclosing casing 18, whereby to establish a driving connection between the band and the casing. The other end of said band is similarly formed with an outstanding projection or key 40 that is received in a similar slot 42 of the cylindrical extension 44 of a radial plate 46. Said plate 46 is free from positive connection with the casing 18 and also with the shaft 10 and is free for movement axially of said shaft. Said plate 46 constitutes an element of an auxiliary clutch and has a friction face 48 which is adapted to be moved into engagement with the face of the radial wall 26 of the clutch drum 24. Said wall 26 and said plate 46 constitute the essential elements of an auxiliary clutch which actuates the main clutch that includes the spiral band 32 and the drum 24.

The main clutch is set by the engagement of the elements of the auxiliary clutch. The auxiliary clutch is set by actuating mechanism which includes pins 50 that are movable axially thereof in radially-directed pin-guiding passages 52 in the cover plate 22. Springs 54 bear against the upper ends of said pins and against plugs 56 which are screw-threaded in the upper ends of said passages whereby to urge said pins for axial movement toward the shaft and into a clutch-disengaged position. The clutch actuating mechanism also includes a sleeve 58 which is carried by and is movable axially on the shaft and has a conical forward end 60 which engages the inner ends of the pins 50 and forces them outwardly and in a clutch-setting direction in the passages. The sleeve is provided with a cylindrical or dwell face 62 which follows the conical face 60 and is adapted to engage the inner ends of the clutch operating pins and maintain them in clutch set position. The clutch pins are provided, intermediate their ends, with notches 64 having inclined bottom walls 66 which are engaged by balls 68 that are freely rotatable in axially directed retaining bushings 70 carried by the cover plate 22. Said balls are adapted to project beyond the inner face of the cover plate and bear rotatably against the outer face of the clutch plate 46. Thus when the sleeve 58 is moved in a clutch-setting direction toward the left, Fig. 1, the inclined surfaces 66 of the clutch actuating pins 50 force said balls toward the left against the clutch plate 46 and thereby force it into frictional engagement with the radial end wall 26 of the drum 24. The clutch plate 46 is thus caused to rotate with the drum, the balls rotating on the plate 46 at the time there is relative motion between them. The rotation of the plate 46 pulls upon the end of the spiral band 32 and causes said band to contract, or to wrap itself around the rotating drum 24, thus clutching the drum and the casing 18 in driving engagement; and the rotation of the drum itself tends to maintain the band engaged therewith although the resiliency of the band is designed to be such that when the driving action of the clutch plate 46 on the end thereof is relieved the inherent resiliency of the band will cause it positively to disengage itself from the drum. The clutch as thus arranged requires only a small amount of effort applied on the actuating sleeve 58 to effect driving engagement between the shaft 10 and the casing 18 or hub 12. The only effort required by the sleeve 58 is that necessary to maintain the clutch plate 46 in driving engagement with the wall 26 of the drum 24, which effort is small. The frictional engagement between the clutch plate 46 and the drum 24 maintains the main clutch, which includes the spiral band 32, in clutching engagement with the drum. The action of the clutch is smooth and positive and a large amount of power can be transmitted for a small diameter of the clutch drum, the limit of the power being the tensile strength of the material composing the band 32.

When the clutch is free, the band expands into contact with the flanges 38 and 44 of the enclosing casing and clutch plate respectively, as illustrated in Fig. 8, where it is supported entirely free from engagement with or drag on the drum 24.

The clutch actuating pins 50 are provided at their inner end with shoulders 72 formed by notches 74 which are at right angles to the notches 64, which shoulders are adapted to bear against pins 76 carried by the cover plate in the clutch-free position of the pins. This arrangement prevents the clutch pins 50 from falling out of the cover plate in the disassembled condition of the clutch, and also prevents the top walls of the notches 64 from engaging the balls 68 and moving them in a clutch-setting direction when the actuating sleeve is in a clutch-free position.

While the casing 18 and its hub 12 has been herein referred to as the driven member it is obvious that it can be the driving member if the clutch band 32 is wound in the opposite direction.

I claim:

1. Clutch mechanism comprising a driving drum, a driven casing surrounding said drum, a spiral wrapping band located within said casing and surrounding said drum and adapted to be wrapped in engagement therewith having one end connected with said casing, an axially movable clutch plate loose in said casing and confronting one end of said drum and having a connection with the other end of said band for wrapping it upon said drum, said plate being otherwise free from driving connection with the aforesaid elements, and actuating mechanism rotatable with said casing for moving said clutch plate axially into driving engagement with said drum.

2. Clutch mechanism comprising the combination of a driving shaft having a clutch member connected therewith, a clutch plate axially movable into engagement with said clutch member, and clutch actuating mechanism comprising a ball carrier which holds the balls against movement radially of the mechanism, balls rotatable and axially movable in said carrier against said clutch plate, said balls also being rotatable on said clutch plate, and means for moving said balls axially to effect engagement between said clutch plate and clutch member.

3. Clutch mechanism comprising the combination of a driving drum having a radial end wall, a casing enclosing said drum having an end plate, a clutch plate located between said drum and said end plate, balls rotatable and movable axially in said end plate in a direction to engage and force said clutch plate into engagement with said drum, said balls being rotatable on said clutch plate, actuating pins slidable radially of the mechanism in said end plate having inclined faces which engage said balls and force them axially of the mechanism in a clutch setting direction, and means for moving said pins in a clutch setting direction.

4. Clutch mechanism comprising the combination of a driving drum, a driven casing surrounding said drum, a spiral wrapping band encircling said drum and having one end thereof anchored to said casing and located in an internal groove in the inner periphery thereof, a clutch plate disposed beside said drum and loose in said casing and having an external groove in its outer periphery in which the other end of said spiral band is anchored, and means for moving said clutch plate axially into clutching engagement with said drum whereby to wrap said spiral band about and in engagement with said drum.

5. Clutch mechanism comprising a driving drum, a driven casing surrounding said drum, a spiral wrapping band encircling said drum and having one end anchored to said casing, an axially movable clutch plate loose in said casing and disposed beside said drum and having an anchorage with the other end of said band, said casing having an open end adjacent said clutch plate, a cover for said open end having clutch actuating members and axially adjustable with respect to said clutch plate to position said actuating members with respect to said clutch plate, and means for moving said members against said clutch plate and said clutch plate axially in clutching engagement with said drum whereby to wrap said band in driving engagement with said drum.

6. Clutch mechanism comprising the combination of a driving drum, a casing surrounding said drum, a spiral wrapping band encircling said drum and having an end anchored to said casing, a clutch plate movable axially in said casing into clutching engagement with said drum and having an anchorage with the other end of said wrapping band, said casing having an axially adjustable end plate located beside said clutch plate, clutch actuating pins carried by said end plate having inclined faces, balls rotatable in said plate on said inclined faces and engageable with and rotatable on said clutch plate, and means for forcing said clutch actuating pins radially of said end plate in a clutch setting direction whereby to force said balls into pressure and rolling engagement with said clutch plate to move said plate axially in a clutch setting direction.

7. Clutch mechanism comprising a driving drum, a driven member, a clutch plate movable axially into frictional engagement with said drum, a spiral clutch band loosely surrounding said drum and having its ends connected respectively to said driven member and clutch plate and adapted to be wound into clutching engagement with said drum when said clutch plate is engaged therewith, and actuating mechanism for said clutch plate carried by said driven member having parts that are movable axially to set the clutch and have rolling engagement with said clutch plate.

8. Clutch mechanism comprising a driving drum, a driven casing surrounding said drum, an axially movable clutch plate confronting the end of said drum and having an axially directed cylindrical extension that surrounds a part of said drum and has an axially slidable engagement with said casing whereby to support said clutch plate in position, a spiral clutch band having one end located in a notch in said cylindrical extension and its other end located in a notch in said casing, and means carried by said casing for moving said clutch plate axially into driving engagement with said drum and thereby to wind said clutch band into driving engagement with said drum.

9. Clutch mechanism comprising a driving drum, a driven casing surrounding said drum and having an open end, a clutch plate confronting said drum near the open end of said casing and having an axially slidable support on said casing but being free from driving engagement therewith, a spiral clutch band having its ends connected with said casing and clutch plate, an end plate having a screw-threaded axially-adjustable connection with said casing and being movable axially thereof, and clutch actuating mechanism carried by said end plate and having means to press said clutch plate axially into driving engagement with said drum.

HARRIE M. GIFFIN.